United States Patent
Luo et al.

(10) Patent No.: US 10,236,954 B2
(45) Date of Patent: Mar. 19, 2019

(54) DATA PROCESSING METHOD AND APPARATUS

(71) Applicant: Huawei Technologies Co., Ltd., Shenzhen (CN)

(72) Inventors: Hejia Luo, Hangzhou (CN); Rong Li, Hangzhou (CN)

(73) Assignee: Huawei Technologies Co., Ltd, Shenzhen (CN)

(*) Notice: Subject to any disclaimer, the term of this patent is extended or adjusted under 35 U.S.C. 154(b) by 0 days.

(21) Appl. No.: 15/716,260

(22) Filed: Sep. 26, 2017

(65) Prior Publication Data

US 2018/0019793 A1    Jan. 18, 2018

Related U.S. Application Data

(63) Continuation of application No. PCT/CN2015/075313, filed on Mar. 27, 2015.

(51) Int. Cl.
*H04B 17/24* (2015.01)
*H04B 7/08* (2006.01)
(Continued)

(52) U.S. Cl.
CPC ......... *H04B 7/0456* (2013.01); *H04B 7/0632* (2013.01); *H04L 1/0026* (2013.01);
(Continued)

(58) Field of Classification Search
CPC .... H04B 7/0632; H04B 7/0417; H04L 5/0048
(Continued)

(56) References Cited

U.S. PATENT DOCUMENTS

| 7,106,813 B1 | 9/2006 | Ling |
| 8,750,204 B2 | 6/2014 | Lee et al. |

(Continued)

FOREIGN PATENT DOCUMENTS

| CN | 1421085 A | 5/2003 |
| CN | 101388703 A | 3/2009 |

(Continued)

OTHER PUBLICATIONS

Samsung, "Considerations on codewords to layers mapping for downlink MIMO," 3GPP TSG RAN WG1 Meeting #47bis R1-070130, Sorrento, Italy, Jan. 15-19, 2007, 8 pages.

(Continued)

*Primary Examiner* — Kevin Kim
(74) *Attorney, Agent, or Firm* — Slater Matsil, LLP

(57) ABSTRACT

The present invention relates to the field of communications network technologies, and discloses a data processing method and apparatus. In embodiments of the present invention, stream channel quality information is obtained, and then port mapping of a to-be-transmitted data stream is determined according to the stream channel quality information. The port mapping is used to make channel quality of data streams distributed in a same code word satisfy the following: a sum of fluctuation values that is used to represent channel quality of data streams in all code words is less than a sum of fluctuation values that is used to represent channel quality of data streams in all code words under original port mapping.

20 Claims, 5 Drawing Sheets

(51) Int. Cl.
| | |
|---|---|
| *H04B 7/0456* | (2017.01) |
| *H04B 7/06* | (2006.01) |
| *H04L 5/00* | (2006.01) |
| *H04W 72/04* | (2009.01) |
| *H04W 72/08* | (2009.01) |
| *H04L 1/00* | (2006.01) |
| *H04W 88/02* | (2009.01) |

(52) U.S. Cl.
CPC .......... *H04L 5/0048* (2013.01); *H04L 5/0057* (2013.01); *H04W 72/0466* (2013.01); *H04W 72/082* (2013.01); *H04W 88/02* (2013.01)

(58) Field of Classification Search
USPC ........................................................ 375/296
See application file for complete search history.

(56) References Cited

U.S. PATENT DOCUMENTS

| | | |
|---|---|---|
| 2008/0069074 A1 | 3/2008 | Shin et al. |
| 2011/0051827 A1* | 3/2011 | Cho et al. ..................... 375/260 |
| 2011/0051865 A1 | 3/2011 | Mergen et al. |
| 2012/0014476 A1* | 1/2012 | Kuchi et al. ................. 375/296 |
| 2012/0099674 A1* | 4/2012 | Moulsley et al. ............ 375/296 |
| 2012/0314740 A1 | 12/2012 | Kwak et al. |
| 2014/0010321 A1 | 1/2014 | Kang et al. |
| 2014/0029648 A1 | 1/2014 | Jin |
| 2014/0155010 A1 | 6/2014 | Bhattacharjee et al. |

FOREIGN PATENT DOCUMENTS

| | | |
|---|---|---|
| CN | 101388704 A | 3/2009 |
| CN | 101277279 B | 12/2010 |
| CN | 101409604 B | 4/2011 |
| CN | 102098252 A | 6/2011 |
| CN | 102158311 A | 8/2011 |
| EP | 1821444 A2 | 8/2007 |
| EP | 2690797 B1 | 6/2017 |
| JP | 2014510490 A | 4/2014 |
| WO | 2008024773 A2 | 2/2008 |
| WO | 2014161145 A1 | 10/2014 |

OTHER PUBLICATIONS

Orange, "Physical layer abstraction for turbo-CWIC receivers," 3GPP TSG-RAN WG4 meeting #68 R4-134100, Barcelona, Spain, Aug. 19-23, 2013, 14 pages.

Nokia et al., "NAICS SU-MIMO Observations and Link-Level Results," 3GPP TSG-RAN WG4 Meeting #68 R4-134156, Barcelona, Spain, Aug. 19-23, 2013, 10 pages.

Namboodiri, V. et al., "Successive Interference Cancellation Based Turbo Equalization for MIMO OFDM Systems", 45th Annual Conference on Information Sciences and Systems, Mar. 23-25, 2011, 6 pages.

\* cited by examiner

DATA PROCESSING METHOD AND APPARATUS

CROSS-REFERENCE TO RELATED APPLICATIONS

This application is a continuation of International Application No. PCT/CN2015/075313, filed on Mar. 27, 2015, the disclosure of which is hereby incorporated by reference in its entirety.

TECHNICAL FIELD

The present invention relates to the field of communications network technologies, and in particular, to a data processing method and apparatus.

BACKGROUND

During data transmission, to increase a data throughput, a MIMO (Multiple Input Multiple Output) system may be used, so that $n_t$ transmit antennas of a transmit end send data separately, and at the same time, a receive end uses $n_r$ receive antennas to receive and restore original data. Both $n_t$ and $n_r$ are integers greater than or equal to 2. Data is encoded and modulated in a unit of code word, and a code word includes at least one data stream. A quantity of data streams in the MIMO system is less than or equal to a smaller value between $n_t$ and $n_r$.

In the prior art, $n_t$ transmit antennas of a network node (for example, a base station) send data separately, and $n_r$ receive antennas of corresponding UE (User Equipment, user equipment) receive the data, and then the UE performs restoration processing on the data. The UE needs to perform the restoration processing on the received data according to a sequence of receiving the data by the receive antennas. As shown in FIG. 1, after receiving the data, the UE first obtains a code word 1; then, performs MIMO equalization 1 (that is, MIMO equalization processing) and channel decoding 1 (that is, channel decoding processing) on code word 1, to obtain processed data 1 after completing the MIMO equalization 1 and the channel decoding 1; and completes processing on code word 1. Subsequently, the UE performs cancellation processing on the processed data 1 and data of a code word 2 to obtain cancellation data 1, and then performs MIMO equalization 2 and channel decoding 2 on the cancellation data 1, so as to obtain processed data 2. By analogy, processing on all code words is finally completed according to the foregoing method.

However, in a process of processing a code word by UE, a previous code word identification result is required for identifying a subsequent code word. Therefore, a code word with good channel quality needs to be preferentially used for identification, to obtain a code word identification result as accurate as possible. However, when there is an excessively great channel quality difference between streams in a code word, estimated code word quality is inaccurate or overall quality of all code words is basically similar, and as a result, a code word with good channel quality cannot be preferentially identified. Consequently, a problem easily occurs in previous code word identification, and then an error occurring in processing of a subsequent code word increases, and processing on the subsequent code word may fail.

SUMMARY

Embodiments of the present invention provide a data processing method and apparatus, so as to resolve a problem that accuracy of received data processed by UE is relatively low.

According to a first aspect, an embodiment of the present invention provides a data processing method. The method includes obtaining stream channel quality information, where the stream channel quality information is used to represent channel quality of a channel on which a data stream is located. The method also includes determining port mapping of a to-be-transmitted data stream according to the stream channel quality information, where the port mapping is used to make channel quality of data streams distributed in a same code word satisfy the following: a sum of fluctuation values that is used to represent channel quality of data streams in all code words is less than a sum of fluctuation values that is used to represent channel quality of data streams in all code words in a case of original port mapping.

In a first possible embodiment, with reference to the first aspect, the obtaining stream channel quality information includes: receiving the stream channel quality information that is sent by user equipment UE, where the stream channel quality information includes quality difference information of the data stream, or quality difference information of a code word corresponding to the data stream, or quality ranking information of the data stream, or change manner information of a port corresponding to the data stream.

In a second possible embodiment, with reference to the first aspect, the obtaining stream channel quality information includes: receiving an uplink pilot signal that is sent by user equipment UE; and generating the stream channel quality information by using the uplink pilot signal that is sent by the UE, where the stream channel quality information includes a signal to interference plus noise ratio SINR of the data stream.

In a third possible embodiment, with reference to the first possible embodiment of the first aspect, the determining port mapping of a to-be-transmitted data stream according to the stream channel quality information includes: determining a modified matrix A according to the stream channel quality information, and determining the port mapping of the to-be-transmitted data stream by using A, where A is used to determine the port mapping of the to-be-transmitted data stream; and when the stream channel quality information includes the quality difference information of the data stream, determining quality of the data stream according to a difference between the quality difference information of the data stream and quality of a reference stream, and determining A according to the quality of the data stream, where the reference stream is a data stream that is pre-agreed by the UE and that is used to determine the quality of the data stream; or when the stream channel quality information includes the quality difference information of the code word corresponding to the data stream, determining quality of the data stream according to a difference between the quality difference information of the code word corresponding to the data stream and quality of a reference code word, and determining A according to the quality of the data stream, where the reference code word is a code word in which the data stream is located; or when the stream channel quality information includes the quality ranking information of the data stream, determining a ranking manner of the data stream according to the quality ranking information of the data stream, and determining A according to the ranking manner of the data stream.

In a fourth possible embodiment, with reference to the first possible embodiment of the first aspect or the third possible embodiment of the first aspect, before the receiving the stream channel quality information that is sent by user equipment UE, the method further includes: receiving request information that is sent by the UE, where the request information is used to request a time-frequency resource for transmitting the stream channel quality information; allocating, according to the request information, the time-frequency resource used for transmitting the stream channel quality information; and sending control feedback information to the UE, where the control feedback information includes a feedback information format and an instruction that is used for instructing the UE to feed back the stream channel quality information; and the receiving the stream channel quality information that is sent by user equipment UE includes: receiving, by using the time-frequency resource, the stream channel quality information that is sent by the UE.

According to a second aspect, an embodiment of the present invention provides a data processing method. The method includes receiving a downlink pilot signal that is sent by a network node. The method also includes generating stream channel quality information according to the downlink pilot signal, where the stream channel quality information is used to indicate channel quality of a channel on which a data stream is located. The method also includes sending the stream channel quality information to the network node.

In a first possible embodiment, with reference to the second aspect, the generating stream channel quality information according to the downlink pilot signal includes: obtaining a signal to interference plus noise ratio SINR of the data stream according to the downlink pilot signal; and generating the stream channel quality information according to the SINR of the data stream.

In a second possible embodiment, with reference to the second aspect or the first possible embodiment of the second aspect, the stream channel quality information includes quality difference information of the data stream, or quality difference information of a code word corresponding to the data stream, or quality ranking information of the data stream, or change manner information of a port corresponding to the data stream.

In a third possible embodiment, with reference to the first possible embodiment of the second aspect or the second possible embodiment of the second aspect, before the receiving a downlink pilot signal that is sent by a network node, the method further includes: sending request information to the network node, where the request information is used to request a time-frequency resource for transmitting the stream channel quality information; receiving control feedback information that is sent by the network node, where the control feedback information includes a feedback information format and an instruction that is used for instructing to feed back the stream channel quality information; and the sending the stream channel quality information to the network node includes: sending the stream channel quality information to the network node by using the time-frequency resource; and the generating the stream channel quality information according to the SINR of the data stream includes: generating, according to the SINR of the data stream, the stream channel quality information in the feedback information format.

According to a third aspect, an embodiment of the present invention provides a data processing apparatus. The apparatus includes: an obtaining module, configured to obtain stream channel quality information, and provide the stream channel quality information to a determining module, where the stream channel quality information is used to represent channel quality of a channel on which a data stream is located; and the determining module, configured to determine port mapping of a to-be-transmitted data stream according to the stream channel quality information, where the port mapping is used to make channel quality of data streams distributed in a same code word satisfy the following: a sum of fluctuation values that is used to represent channel quality of data streams in all code words is less than a sum of fluctuation values that is used to represent channel quality of data streams in all code words in a case of original port mapping.

In a first possible embodiment, with reference to the third aspect, the obtaining module includes: a receiving unit, configured to receive the stream channel quality information that is sent by user equipment UE, where the stream channel quality information includes quality difference information of the data stream, or quality difference information of a code word corresponding to the data stream, or quality ranking information of the data stream, or change manner information of a port corresponding to the data stream.

In a second possible embodiment, with reference to the first possible embodiment of the third aspect, the obtaining module further includes a generation unit, where the receiving unit is further configured to receive an uplink pilot signal that is sent by the user equipment UE; and the generation unit is configured to generate the stream channel quality information by using the uplink pilot signal that is sent by the UE, where the stream channel quality information includes a signal to interference plus noise ratio SINR of the data stream.

In a third possible embodiment, with reference to the first possible embodiment of the third aspect, the determining module is specifically configured to determine a modified matrix A according to the stream channel quality information, and determine the port mapping of the to-be-transmitted data stream by using A, where A is used to determine the port mapping of the to-be-transmitted data stream; and the determining module is further configured to: when the stream channel quality information includes quality difference information of the data stream, determine quality of the data stream according to a difference between the quality difference information of the data stream and quality of a reference stream, and determine A according to the quality of the data stream, where the reference stream is a data stream that is pre-agreed by the UE and that is used to determine the quality of the data stream; or when the stream channel quality information includes quality difference information of a code word corresponding to the data stream, determine quality of the data stream according to a difference between the quality difference information of the code word corresponding to the data stream and quality of a reference code word, and determine A according to the quality of the data stream, where the reference code word is a code word in which the data stream is located; or when the stream channel quality information includes quality ranking information of the data stream, determine a ranking manner of the data stream according to the quality ranking information of the data stream, and determine A according to the ranking manner of the data stream.

In a fourth possible embodiment, with reference to the first possible embodiment of the third aspect or the third possible embodiment of the third aspect, the apparatus further includes a receiving module, an allocation module, and a sending module, where: the receiving module is configured to receive request information that is sent by the UE, where the request information is used to request a time-frequency resource for transmitting the stream channel quality information; the allocation module is configured to allocate, according to the request message, the time-frequency resource used for transmitting the stream channel quality information; the sending module is configured to send control feedback information to the UE, where the control feedback information includes a feedback information format and an instruction that is used for instructing the UE to feed back the stream channel quality information; and the receiving module is specifically configured to receive, by using the time-frequency resource, the stream channel quality information that is sent by the UE.

According to a fourth aspect, an embodiment of the present invention provides a data processing apparatus. The apparatus includes: a receiving module, configured to receive a downlink pilot signal that is sent by a network node, and provide the downlink pilot signal to a generation module. The apparatus also includes the generation module, configured to generate stream channel quality information according to the downlink pilot signal, and provide the stream channel quality information to a sending module, where the stream channel quality information is used to represent channel quality of a channel on which a data stream is located. The apparatus also includes the sending module, configured to send the stream channel quality information to the network node.

In a first possible embodiment, with reference to the fourth aspect, the generation module is specifically configured to obtain a signal to interference plus noise ratio SINR of the data stream according to the downlink pilot signal, and generate the stream channel quality information according to the SINR of the data stream.

In a second possible embodiment, with reference to the fourth aspect or the first possible embodiment of the fourth aspect, the stream channel quality information includes quality difference information of the data stream, or quality difference information of a code word corresponding to the data stream, or quality ranking information of the data stream, or change manner information of a port corresponding to the data stream.

In a third possible embodiment, with reference to the first possible embodiment of the fourth aspect or the second possible embodiment of the fourth aspect, the sending module is further configured to send request information to the network node, where the request information is used to request a time-frequency resource for transmitting the stream channel quality information; the receiving module is further configured to receive control feedback information that is sent by the network node, where the control feedback information includes a feedback information format and an instruction that is used for instructing the UE to feed back the stream channel quality information; the sending module is specifically configured to send the stream channel quality information to the network node by using the time-frequency resource; and the generation module is specifically configured to generate, according to the SINR of the data stream, the stream channel quality information in the feedback information format.

According to a fifth aspect, an embodiment of the present invention provides a data processing apparatus. The apparatus includes: a memory, configured to store information including a program instruction. The apparatus also includes a processor, coupled to the memory, configured to control execution of the program instruction, and specifically configured to obtain stream channel quality information, where the stream channel quality information is used to represent channel quality of a channel on which a data stream is located; and determine port mapping of a to-be-transmitted data stream according to the stream channel quality information, where the port mapping is used to make channel quality of data streams distributed in a same code word satisfy the following: a sum of fluctuation values that is used to represent channel quality of data streams in all code words is less than a sum of fluctuation values that is used to represent channel quality of data streams in all code words in a case of original port mapping.

In a first possible embodiment, with reference to the fifth aspect, the apparatus further includes a receiver, where the receiver is configured to receive the stream channel quality information that is sent by user equipment UE, where the stream channel quality information includes quality difference information of the data stream, or quality difference information of a code word corresponding to the data stream, or quality ranking information of the data stream, or change manner information of a port corresponding to the data stream.

In a second possible embodiment, with reference to the first possible embodiment of the fifth aspect, the receiver is further configured to receive an uplink pilot signal that is sent by the user equipment UE; and the processor is configured to generate the stream channel quality information by using the uplink pilot signal that is sent by the UE, where the stream channel quality information includes a signal to interference plus noise ratio SINR of the data stream.

In a third possible embodiment, with reference to the fifth aspect, the processor is further configured to determine a modified matrix A according to the stream channel quality information, and determine the port mapping of the to-be-transmitted data stream by using A, where A is used to determine the port mapping of the to-be-transmitted data stream; and the processor is specifically configured to: when the stream channel quality information includes quality difference information of the data stream, determine quality of the data stream according to a difference between the quality difference information of the data stream and quality of a reference stream, and determine A according to the quality of the data stream, where the reference stream is a data stream that is pre-agreed by the UE and that is used to determine the quality of the data stream; or when the stream channel quality information includes quality difference information of a code word corresponding to the data stream, determine quality of the data stream according to a difference between the quality difference information of the code word corresponding to the data stream and quality of a reference code word, and determine A according to the quality of the data stream, where the reference code word is a code word in which the data stream is located; or when the stream channel quality information includes quality ranking information of the data stream, determine a ranking manner of the data stream according to the quality ranking information of the data stream, and determine A according to the ranking manner of the data stream.

In a fourth possible embodiment, with reference to the fifth aspect or the third possible embodiment of the fifth aspect, the apparatus further includes a transmitter, where: the receiver is further configured to receive request information that is sent by the UE, where the request information is used to request a time-frequency resource for transmitting the stream channel quality information; the processor is further configured to allocate, according to the request message, the time-frequency resource used for transmitting the stream channel quality information; and the transmitter is configured to send control feedback information to the UE, where the control feedback information includes a feedback information format and an instruction that is used for instructing the UE to feed back the stream channel quality information, where a format of the stream channel quality information and the feedback information format are the same; and the receiver is specifically configured to receive, by using the time-frequency resource, the stream channel quality information that is sent by the UE.

According to a sixth aspect, an embodiment of the present invention provides a data processing apparatus. The apparatus includes: a memory, configured to store information including a program instruction. The apparatus also includes a receiver, configured to receive a downlink pilot signal that is sent by a network node, and provide the downlink pilot signal to the processor. The apparatus also includes the processor, coupled to the memory, the receiver, and a transmitter, configured to control execution of the program instruction, and specifically configured to generate stream channel quality information according to the downlink pilot signal, and provide the stream channel quality information to the transmitter, where the stream channel quality information is used to represent channel quality of a channel on which a data stream is located. The apparatus also includes the transmitter, configured to send the stream channel quality information to the network node.

In a first possible embodiment, with reference to the sixth aspect, the processor is specifically configured to obtain a signal to interference plus noise ratio SINR of the data stream according to the downlink pilot signal, and generate the stream channel quality information according to the SINR of the data stream.

In a second possible embodiment, with reference to the sixth aspect or the first possible embodiment of the sixth aspect, the stream channel quality information includes quality difference information of the data stream, or quality difference information of a code word corresponding to the data stream, or quality ranking information of the data stream, or change manner information of a port corresponding to the data stream.

In a third possible embodiment, with reference to the first possible embodiment of the sixth aspect or the second possible embodiment of the sixth aspect, the transmitter is further configured to send request information to the network node, where the request information is used to request a time-frequency resource for transmitting the stream channel quality information; the receiver is further configured to receive control feedback information that is sent by the network node, where the control feedback information includes a feedback information format and an instruction that is used for instructing the UE to feed back the stream channel quality information; the transmitter is specifically configured to send the stream channel quality information to the network node by using the time-frequency resource; and the processor is specifically configured to generate, according to the SINR of the data stream, the stream channel quality information in the feedback information format.

According to the data processing method and apparatus provided in the embodiments of the present invention, stream channel quality information is obtained, and then port mapping of a to-be-transmitted data stream is adjusted according to the stream channel quality information, so that data streams with similar channel quality are distributed in a same code word. In the prior art, UE can successively process code words only according to channel quality information of the code words. When there is an excessively great channel quality difference between streams in a code word, estimated code word quality may be inaccurate or overall quality of all code words is basically similar, and as a result, a code word with good channel quality cannot be preferentially identified. Consequently, a problem easily occurs in previous code word identification, and then an error occurring in processing of a subsequent code word increases, and processing on the subsequent code word may fail. This is because in the prior art, a network node (a base station) cannot learn of channel quality corresponding to a data stream, and consequently, quality of a code word having at least two data streams may be inaccurate. In the embodiments of the present invention, the port mapping of the to-be-transmitted data stream is adjusted by using the obtained stream channel quality information, so that a channel quality difference between ports for transmitting data streams is relatively stable, and therefore accuracy of obtained code word quality corresponding to a code word including multiple data streams is relatively high, and accuracy of received data processed by the UE is relatively high.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
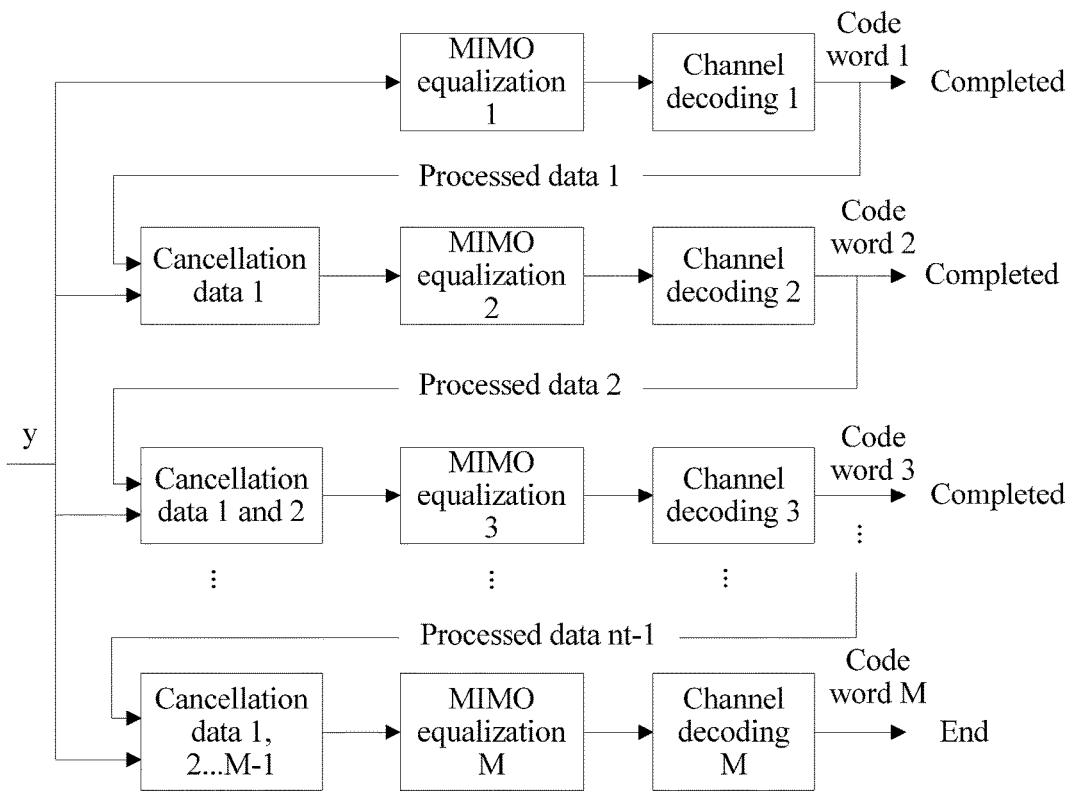
FIG. 1 is a schematic flowchart of processing a received signal by UE according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from one component interacting with another component in a local system, a distributed system, and/or across a network such as the Internet interacting with other systems by using the signal).

Technologies described in this specification may be applied to various communications systems, for example, current 2G and 3G communications systems and a next-generation communications system, for example, a GSM (Global System for Mobile communications), a CDMA (Code Division Multiple Access) system, a TDMA (Time Division Multiple Access) system, a WCDMA (Wideband Code Division Multiple Access) system, an FDMA (Frequency Division Multiple Access) system, an OFDMA (Orthogonal Frequency-Division Multiple Access) system, a single-carrier FDMA (SC-FDMA) system, a GPRS (General Packet Radio Service) system, an LTE (Long Term Evolution) system, and other communications systems.

Various aspects are described in this specification with reference to a terminal and/or a network node (or network device).

The network node may be a device that communicates with the wireless terminal over an air interface in an access network by using one or more sectors. The network node may be configured to mutually convert a received over-the-air frame and an IP packet and serve as a router between the wireless terminal and a rest portion of the access network, where the rest portion of the access network may include an Internet protocol (IP) network. The network node may coordinate attribute management of the air interface. For example, the network node may be a NodeB (NodeB) in the WCDMA, or may be an evolved NodeB (NodeB, eNB, or e-NodeB) in LTE, and is not limited in this application.

UE may be a wireless terminal. The wireless terminal may refer to a device that provides a user with voice and/or data connectivity, a handheld device with a radio connection function, or another processing device connected to a radio modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be called a system, a subscriber unit, a subscriber station, a mobile station, a mobile terminal, a remote station, an access point, a remote terminal, an access terminal, a user terminal, a user agent, or a user equipment.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the embodiments of the present invention, the MIMO system may be denoted as:

$$y=HPx+n \qquad (1)$$

In formula (1), x is a transmit signal vector, and y is a receive signal vector. Generally, n is a complex Gaussian noise vector meeting an average value of 0 and a variance of $\sigma_2$, H is a MIMO channel matrix, and P is a precoding matrix. A dimension of x is $n_l \times 1$, dimensions of y and n are $n_r \times 1$, a dimension of H is $n_r \times n_t$, and a dimension of P is $n_t \times n_l$. $n_l$ is a quantity of to-be-transmitted signal streams, $n_t$ is a quantity of transmit antennas, and $n_r$ is a quantity of receive antennas. When the quantities $n_l$ and $n_r$ of the transmit and receive antennas are given, a maximum value of $n_l$ may be $\min(n_t, n_r)$. The precoding matrix P projects the transmit signal vector x from a logical port to a real antenna transmit port, and therefore $n_l$ does not need to be equal to $n_t$.

Figure 2:
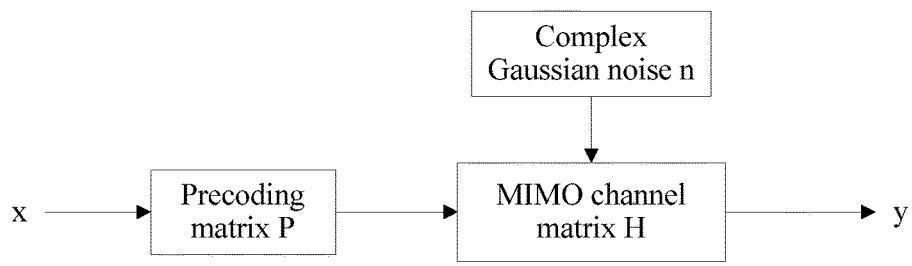
FIG. 2 is a schematic flowchart of processing a signal by a MIMO system according to an embodiment of the present invention.

As shown in FIG. 2, a signal x that is sent by a base band is multiplied by the precoding matrix P, so as to obtain a signal Px. Then the signal Px is sent to UE by using the real transmit port, during which the signal Px passes a MIMO channel, and there is complex Gaussian noise in a receiving process. Therefore, a signal received by the UE is y=HPx+n.

Figure 3:
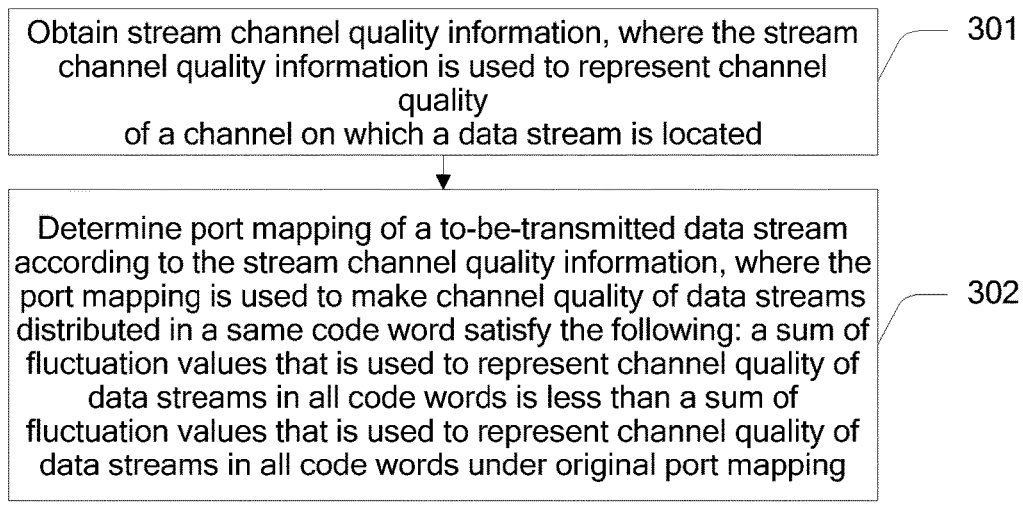
FIG. 3 is a flowchart of a data processing method according to an embodiment of the present invention.

As shown in FIG. 3, an embodiment of the present invention provides a data processing method, which is applicable to a MIMO system. It is noted in advance that the embodiments of the present invention are applicable to a network node (or a network device), and the method is specifically as follows.

301. Obtain stream channel quality information, where the stream channel quality information is used to represent channel quality of a channel on which a data stream is located.

302. Determine port mapping of a to-be-transmitted data stream according to the stream channel quality information, where the port mapping is used to make channel quality of data streams distributed in a same code word satisfy the following: a sum of fluctuation values that is used to represent channel quality of data streams in all code words is less than a sum of fluctuation values that is used to represent channel quality of data streams in all code words in a case of original port mapping.

According to the data processing method provided in this embodiment of the present invention, stream channel quality information is obtained, and then port mapping of a to-be-transmitted data stream is adjusted according to the stream channel quality information, so that data streams with similar channel quality are distributed in a same code word, and the channel quality of the data streams in the same code word satisfies the following: a sum of fluctuation values that is used to represent channel quality of data streams in all code words is less than a sum of fluctuation values that is used to represent channel quality of data streams in all code words in a case of original port mapping. In the prior art, UE can successively process code words only according to channel quality information of the code words. When there is an excessively great channel quality difference between streams in a code word, estimated code word quality may be inaccurate or overall quality of all code words is basically similar, and as a result, a code word with good channel quality cannot be preferentially identified. Consequently, a problem easily occurs in previous code word identification, and then an error occurring in processing of a subsequent code word increases, and processing on the subsequent code word may fail. A cause of the problem is that in the prior art, a network node cannot learn of channel quality corresponding to a data stream, and consequently, code word quality of a code word having at least two data streams may be inaccurate. In the embodiments of the present invention, the port mapping of the to-be-transmitted data stream is adjusted by the network node by using the obtained stream channel quality information, so that a channel quality difference between ports for transmitting data streams is relatively stable, and therefore accuracy of obtained code word quality corresponding to a code word including multiple data streams is relatively high, and accuracy of received data processed by the UE is relatively high.

It may be understood that when the data streams with the similar channel quality are distributed in the same code word, a channel quality difference between code words may be increased, and further the accuracy of the received data processed by the UE may be improved.

In the embodiments of the present invention, the stream channel quality information may include quality difference information of the data stream, or quality difference information of a code word corresponding to the data stream, or quality ranking information of the data stream, or change manner information of a port corresponding to the data stream, or a SINR (Signal Interference Noise Ratio, signal to interference plus noise ratio) of the data stream.

The network node obtains a rank of the channel quality of the data streams by using the stream channel quality information (the quality difference information of the data stream, or the quality difference information of the code word corresponding to the data stream, or the SINR of the data stream), and then obtains, according to the rank of the channel quality of the data streams, a fluctuation value used to present a fluctuation degree of the channel quality in the code word. Alternatively, the network node obtains, by using the stream channel quality information (the quality ranking information of the data stream), a fluctuation value used to present a fluctuation degree of the channel quality in the code words.

For example, the fluctuation value used to present the fluctuation degree is denoted as P, and an expression of P is $$P = \sum_{i=1}^{nCW} \|[Q_{i1} - \overline{Q}_i, Q_{i2} - \overline{Q}_i, \ldots Q_{ik(i)} - \overline{Q}_i]\|_{nCW}$$

is a quantity of code words, $Q_{ij}$ is a rank of the $j^{th}$ stream in the $i^{th}$ code word in all streams, and $\overline{Q}_i$ is an average rank value of streams in the $i^{th}$ code word in all streams. A quantity of streams in each code word is k, and k is a function of i, that is, quantities of streams in different code words may be different. An operator $\|\cdot\|$ may be a first-order norm, that is, $\|[Q_{i1} - \overline{Q}_i, Q_{i2} - \overline{Q}_i, \ldots Q_{ik(i)} - \overline{Q}_i]\|_1 = |Q_{i1} - \overline{Q}_i| + |Q_{i2} - \overline{Q}_i| + \ldots + |Q_{ik(i)} - \overline{Q}_i|$, or a second-order norm, that is $\|[Q_{i1} - \overline{Q}_i, Q_{i2} - \overline{Q}_i, \ldots Q_{ik(i)} - \overline{Q}_i]\|_2 = \sqrt{|Q_{i1} - \overline{Q}_i|^2 + |Q_{i2} - \overline{Q}_i|^2 + \ldots + |Q_{ik(i)} - \overline{Q}_i|^2}$, or another operator with a similar function.

Alternatively, when the stream channel quality information includes the change manner information of the port corresponding to the data stream, the network node does not need to calculate the fluctuation value used to represent the fluctuation degree of the channel quality in the code word, and may directly determine the port mapping of the to-be-transmitted data stream according to the change manner information of the port corresponding to the data stream.

In addition, it should be noted that the network node may obtain the stream channel quality information in multiple manners. Two manners are listed herein.

First manner: The network node receives the stream channel quality information that is sent by the UE, where the stream channel quality information includes the quality difference information of the data stream, or the quality difference information of the code word corresponding to the data stream, or the quality ranking information of the data stream, or the change manner information of the port corresponding to the data stream.

A data stream is in a one-to-one correspondence with a channel on which the data stream is located, and therefore channel quality of the data stream may be represented by using an SINR of the data stream. Because transmission resources are limited, and in an actual communications system, there is an increasing quantity of data streams, signaling overheads needed for feedback increase. To save transmission resources, in the embodiments of the present invention, the UE uses the quality difference information of the data stream, or the quality difference information of the code word corresponding to the data stream, or the quality ranking information of the data stream, or the change manner information of the port corresponding to the data stream to represent quality information of the channel on which the data stream is located, where the information is fed back to the network node.

When the stream channel quality information includes the quality difference information of the data stream, the network node pre-agrees on a reference stream with the UE. The quality difference information of the data stream is a quality difference of a related data stream relative to the reference stream. For example, there are four to-be-transmitted data streams in total (stream 1, stream 2, stream 3, and stream 4), and quality of data streams received by a receive end is respectively high, low, intermediate, and extremely low according to a sequence. Stream 1 is used as a reference stream for feedback, and stream difference information of only subsequent three streams (stream 2, stream 3, and stream 4) needs to be fed back. For example, when stream 1 is set to be 0, quality differences of the subsequent three streams are respectively −2, −1, and −3. It may be understood that −2, −1, and −3 are used to represent a difference relationship with the reference stream, and two bits need to be fed back for each stream herein, and six bits are fed back in total. The network node may grasp, by using the six-bit information, complete quality ranking information of a stream detected on a UE side, so that a volume of feedback information may be reduced.

Further, for a MIMO system having N data streams, a quantity of bits that need to be fed back for each stream is $\lfloor \log 2(N-1) \rfloor + 1$. If N=8, three bits are occupied for each data stream, and 21 bits are fed back in total.

When the stream channel quality information includes the quality difference information of the code word corresponding to the data stream, the quality difference information of the code word corresponding to the data stream is a difference information value of quality of the data stream relative to the code word in which the data stream is located. For example, there are four to-be-transmitted data streams, and two code words (code word 0 and code word 1) in total, and each code word has two streams (code word 0 is corresponding to stream 1 and stream 2, and code word 1 is corresponding to stream 3 and stream 4). A receive end detects that quality of each code word is 15 and 20 (a 5-bit CQI (Channel Quality Index, channel quality indication) and 32-level quantization in an existing MIMO system are used as an example). Channel quality quantization results of the two streams (stream 1 and stream 2) in code word 0 are respectively 13 and 18, and in this case, quality differences that are fed back and that are of stream 1 and stream 2 relative to the reference code word (code word 0) are −2 and +3. Channel quality quantization results of the two streams (stream 3 and stream 4) in code word 1 are respectively 16 and 25, and in this case, quality differences that are fed back and that are of stream 3 and stream 4 relative to the reference code word (code word 1) are −4 and +5. Therefore, the network node may calculate channel quality information of a code word and a difference of quality of a data stream in the code word relative to overall quality of the code word, so as to obtain quality of all data streams.

When the stream channel quality information includes the quality ranking information of the data stream, the quality ranking information of the data stream is a rank number of the data stream. The rank number of the data stream is a rank number pre-agreed by the UE with the network node, and all rank numbers of a group of data streams represent ranking sequences of the group of the data streams. For example, the UE receives four streams, and an appropriate ranking manner is obtained by calculation after channel quality of the four data streams is measured and evaluated. For the four data streams, there are 4!=24 ranking combinations in total. Correspondences between ranking manners and sequence numbers of the 24 combinations are pre-agreed between the network node and the UE. The UE feeds back the rank number of the data stream, and the network node may learn of the ranking manner of the data stream by querying an agreed data stream rank number mapping table after receiving the rank number of the data stream. When there are N data streams, a quantity of bits that need to be fed back is $\lfloor \log 2(N!) \rfloor + 1$, and ! represents factorial.

Four data streams are used as an example for description. The four data streams are respectively stream 1, stream 2, stream 3, and stream 4. An identifier of stream 1 is A, an identifier of stream 2 is B, an identifier of stream 3 is C, and an identifier of stream 4 is D. It is assumed that the data streams are ranked in descending order of quality. If rank numbers of the group of the data streams are ABCD, it indicates that in this group, the data streams are ranked as stream 1, stream 2, stream 3, and stream 4 in descending order of quality. If the rank numbers of the group of the data streams are BADC, it indicates that in this group, the data streams are ranked as stream 2, stream 1, stream 4, and stream 3 in descending order of quality. It may be understood that an identifier of a data stream is an identifier pre-agreed by the network node with the UE.

When the stream channel quality information includes the change manner information of the port corresponding to the data stream, the change manner information of the port corresponding to the data stream is a sequence number corresponding to a port mapping change manner of the data stream. For example, the UE receives two code words (code word 0 and code word 1) and four data streams (stream 1, stream 2, stream 3, and stream 4). Channel quality of the four data streams (stream 1, stream 2, stream 3, and stream 4) is respectively high, low, lowest, and intermediate. Code word 0 is corresponding to the first two data streams (stream 1 and stream 2), and code word 1 is corresponding to the last two data streams (stream 3 and stream 4). In this case, stream 2 corresponding to the channel quality "low" and the data stream corresponding to the channel quality "intermediate" may be transposed. A port number and a transposition manner that are corresponding to a data stream are pre-agreed by the network node with the UE. For example, port numbers of the four data streams are respectively A, B, C, D. When stream 2 and stream 4 are transposed, the change manner information of the port corresponding to the data stream may be BD. BD indicates that stream 2 and stream 4 are transposed. Likewise, when stream 1 and stream 4 are transposed, the change manner information of the port corresponding to the data stream may be AD.

It needs to be noted that, for the four data streams, there may be $C_4^2 = 6$ combinations, and therefore $\lfloor \log 2(6) \rfloor + 1 = 3$ bits need to be fed back at a time. When there are N streams, $\lfloor \log 2(C_N^2) \rfloor + 1$ bits need to be fed back at a time. If an optimal case cannot be implemented by means of one-time transposition, transposition needs to be performed for multiple times to implement the optimal case. If a quantity of streams adjusted at a time is greater than 2, a quantity of bits that are fed back is $\lfloor \log 2(C_N^a) \rfloor + 1$, and a is the quantity of streams adjusted at a time.

Second manner: The network node receives an uplink pilot signal that is sent by the UE, and the network node generates the stream channel quality information by using the uplink pilot signal that is sent by the UE, and the stream channel quality information includes an SINR of the data stream.

For the second manner, after receiving the uplink pilot signal, the network node calculates a channel matrix H of each subcarrier in each data stream according to pilot information in the uplink pilot signal. Then an SINR of each subcarrier is calculated by using the channel matrix H of each subcarrier, and an SINR of each data stream corresponding to the SINR of each subcarrier in each data stream is calculated by using a preset algorithm.

For example, when a linear receiver (receive end) is used to obtain the SINR corresponding to each data stream, the following formula (5) may be used:

$$SINR_m(k) = \frac{|w_k^H h_k|^2}{\sum_{i \neq k}^{n_l} |w_k^H h_i|^2 + |w_k^H n|^2} \quad (5)$$

$SINR_m(k)$ represents an SINR of the $m^{th}$ subcarrier in the $k^{th}$ data stream, k represents a serial number of a data stream, m represents a serial number of a subcarrier, m, k, and $n_1$ are all integers greater than 0, and $0 < k \leq n_1$, w represents a weight matrix obtained by means of calculation according to the channel matrix H, $w_k$ represents the $k^{th}$ column of weighted vectors of w, $h_i$ represents the $i^{th}$ column of vectors of the channel matrix H, $h_k$ represents the $k^{th}$ column of vectors of the channel matrix H, and n represents a noise vector received by the linear receiver.

The SINR of the data stream is obtained by using an equivalent SINR combination algorithm. Specifically, refer to formula (6).

$$SINREFF(k) = \frac{1}{N_{sc}} \sum_{m=1}^{N_{sc}} SINR_m(k) \quad (6)$$

$SINREFF_k$ represents an SINR of the $k^{th}$ data stream, and $N_{SC}$ represents a quantity of to-be-combined subcarriers.

Alternatively, the SINR of the data stream may be obtained by using an EESM (Exponential Effective Signal Interference noise ratio Mapping, exponential effective signal interference noise ratio mapping) algorithm. Specifically, refer to formula (7).

$$SINREFF(k) = -\beta \ln \frac{1}{N_{sc}} \sum_{m=1}^{N_{sc}} e^{-\frac{SINR_m(k)}{\beta}} \quad (7)$$

β represents an effective factor, and may be obtained by calibrating a performance curve of an actual link and a performance curve of an AWGN (Additive White Gaussian Noise, additive white Gaussian noise) link with same spectrum efficiency.

Optionally, in another embodiment of the present invention, in step 302 shown in FIG. 3, a modified matrix A is determined according to the stream channel quality information, and the port mapping of the to-be-transmitted data stream is adjusted by using A, where A is used to determine the port mapping of the to-be-transmitted data stream.

When the stream channel quality information includes the quality difference information of the data stream, the network node determines quality of the data stream according to a difference between the quality difference information of the data stream and quality of a reference stream, and determines A according to the quality of the data stream, where the reference stream is a data stream that is pre-agreed by the network node with the UE and that is used to determine the quality of the data stream.

When the stream channel quality information includes the quality difference information of the code word corresponding to the data stream, the network node determines quality of the data stream according to a difference between the quality difference information of the code word corresponding to the data stream and quality of a reference code word, and determines A according to the quality of the data stream, where the reference code word is a code word in which the data stream is located.

When the stream channel quality information includes the quality ranking information of the data stream, the network node determines a ranking manner of the data stream according to the quality ranking information of the data stream, and determines A according to the ranking manner of the data stream.

After determining A, the network node may modify a precoding matrix P by using A, and further adjust logical port mapping of the to-be-transmitted data stream. For example, a signal sent by the network node is x, and the precoding matrix P is multiplied by the modified matrix A to obtain a signal PAx.

The modified matrix A may be a row-switching elementary matrix, for example, a 4×4 elementary row-switching matrix.

$$A = \begin{bmatrix} 1 & & & \\ & & 1 & \\ & 1 & & \\ & & & 1 \end{bmatrix}$$

A result obtained by multiplying A by a column vector x whose quantity of elements is 4 is a result obtained by transposing locations of the second element and the third element of x, that is:

$$Ax = \begin{bmatrix} 1 & & & \\ & & 1 & \\ & 1 & & \\ & & & 1 \end{bmatrix} \begin{bmatrix} x_1 \\ x_2 \\ x_3 \\ x_4 \end{bmatrix} = \begin{bmatrix} x_1 \\ x_3 \\ x_2 \\ x_4 \end{bmatrix}$$

Equivalently, if P and A are regarded as a whole, PA means that columns in P are transposed. For example:

$$PA = \begin{bmatrix} p_1 & p_2 & p_3 & p_4 \end{bmatrix} \begin{bmatrix} 1 & & & \\ & & 1 & \\ & 1 & & \\ & & & 1 \end{bmatrix} = \begin{bmatrix} p_1 & p_3 & p_2 & p_4 \end{bmatrix}$$

$p_i$ represents a column in P, and i=1, 2, 3, 4. In the matrix A, the second column and the third column of P are transposed. A sequence of elements in the x vector is a sequence of ports. The sequence of the elements in the x vector may be equivalently changed by changing a sequence of columns in P.

Optionally, as another embodiment of the present invention, before step 301 shown in FIG. 3, the network node sends control feedback information to the UE. The control feedback information includes a feedback information format and an instruction that is used for instructing the UE to feed back the stream channel quality information, where a format of the stream channel quality information and the feedback information format are the same. Then, the network node receives a quality information application that is sent by the UE. The quality information application is used to apply to send the stream channel quality information to the network node. Finally, the network node applies, according to the quality information application, to enable a receiving path for receiving the stream channel quality information.

It should be noted that, when the network node controls, according to the quality information application that is sent by the UE, the receiving path for receiving the stream channel quality information, it may indicate that the receiving path for receiving the stream channel quality information is an independent and dedicated receiving path. Resources may be saved by controlling, according to the quality information application in real time, enabling and disabling of the receiving path for receiving the stream channel quality information. Certainly, when there are sufficient resources, the receiving path for receiving the stream channel quality information may be always enabled.

In addition, it should be noted that, no limitation is imposed on a type of the receiving path for receiving the stream channel quality information in the embodiments of the present invention. For example, the receiving path may be the foregoing dedicated path, or may be a receiving path shared for transmitting other signaling.

It may be understood that, when the network node needs to send the control feedback information to the UE, it indicates that the stream channel quality information obtained by the network node is stream channel quality information provided by the UE. When the network node generates the stream channel quality information independently, there is no receiving path for receiving the stream channel quality information.

In addition, after receiving the control feedback information that is sent by the network node, the UE starts to calculate a channel matrix H of each subcarrier in each stream according to pilot information in a downlink pilot signal, and then obtains an SINR of each subcarrier according to the channel matrix H of each subcarrier in each stream, and calculates an SINR of each stream by using a preset algorithm.

It can be seen that, a manner in which the UE calculates the SINR of each stream is the same as a manner in which the network node calculates the SINR of each stream, and details are not described herein again.

After obtaining the SINR of each stream, the UE generates the stream channel quality information according to the feedback information format in the control feedback information. When the feedback information format is a quality difference format of the data stream, the stream channel quality information includes quality difference information of the data stream; when the feedback information format is a quality difference format of a code word, the stream channel quality information includes quality difference information of a code word corresponding to the data stream; when the feedback information format is a quality ranking format of the data stream, the stream channel quality information includes quality ranking information of the data stream; and when the feedback information format is a change format of a port corresponding to the data stream, the stream channel quality information includes change manner information of the port corresponding to the data stream.

Figure 4:
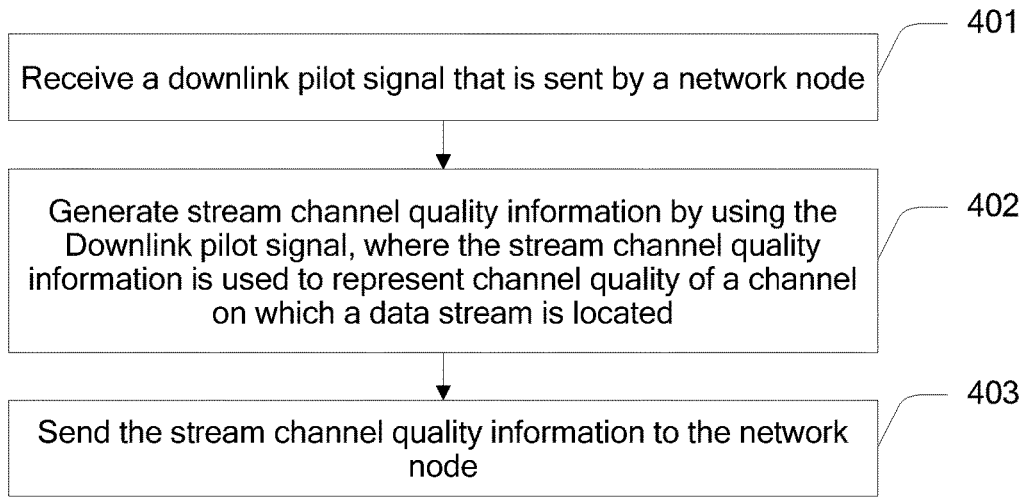
FIG. 4 is a flowchart of another data processing method according to an embodiment of the present invention.

As shown in FIG. 4, an embodiment of the present invention further provides a data processing method, which is applicable to a MIMO system. The method is applied to UE, and is specifically as follows.

401. Receive a downlink pilot signal that is sent by a network node.

402. Generate stream channel quality information by using the downlink pilot signal, where the stream channel quality information is used to represent channel quality of a channel on which a data stream is located.

403. Send the stream channel quality information to the network node.

According to the data processing method provided in this embodiment of the present invention, a UE receives a downlink pilot signal that is sent by a network node, generates stream channel quality information according to the downlink pilot signal, where the stream channel quality information is used to represent channel quality of a channel on which a data stream is located, and sends the stream channel quality information to the network node. In the prior art, the UE can successively process code words only according to channel quality information of the code words. When there is an excessively great channel quality difference between streams in a code word, estimated code word quality may be inaccurate or overall quality of all code words is basically similar, and as a result, a code word with good channel quality cannot be preferentially identified. Consequently, a problem easily occurs in previous code word identification, and then an error occurring in processing of a subsequent code word increases, and processing on the subsequent code word may fail. A cause of the problem is that in the prior art, a network node (base station) cannot learn of channel quality corresponding to a data stream, and consequently, code word quality of a code word having at least two data streams may be inaccurate. In embodiments of the present invention, the UE notifies the network node of quality of the data stream (the stream channel quality information), so that the network node adjusts, according to the stream channel quality information, the port mapping of the to-be-transmitted data stream, so that a channel quality difference between ports for transmitting data streams is relatively stable, and therefore accuracy of obtained code word quality corresponding to a code word including multiple data streams is relatively high, and accuracy of received data processed by the UE is relatively high.

Optionally, as another embodiment of the present invention, a manner of the generating, by the UE, the stream channel quality information according to the downlink pilot signal may be: obtaining an SINR of the data stream according to the downlink pilot signal, and generating the stream channel quality information according to the SINR of the data stream.

It can be learned from the foregoing description that the stream channel quality information includes at least one type of information in the following information: quality difference information of the data stream, quality difference information of a code word corresponding to the data stream, quality ranking information of the data stream, or change manner information of a port corresponding to the data stream.

Optionally, as another embodiment of the present invention, before step 401 shown in FIG. 4, the UE sends a request message to the network node, where the request information is used to request a time-frequency resource for transmitting the stream channel quality information.

Then, after receiving the request message, the network node sends control feedback information to the UE, where the control feedback information includes a feedback information format and an instruction that is used for instructing the UE to feed back the stream channel quality information. After receiving the control feedback information, the UE sends the stream channel quality information to the network node by using the time-frequency resource allocated by the network node.

Figure 5:
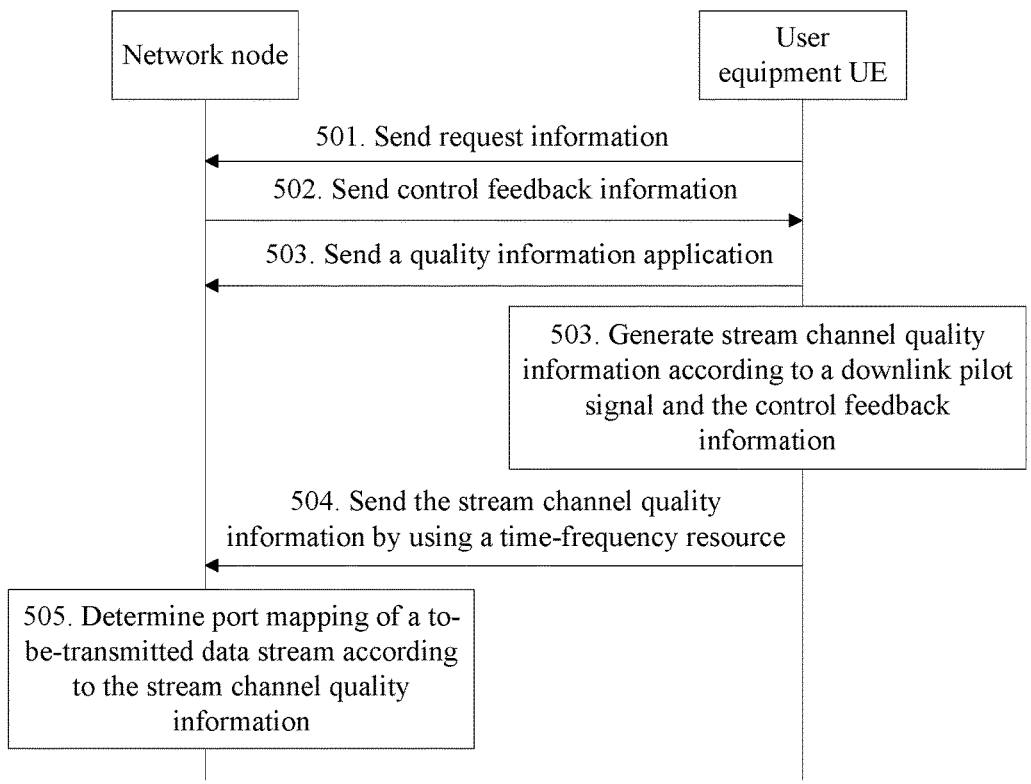
FIG. 5 is a flowchart of still another data processing method according to an embodiment of the present invention.

With reference to the foregoing description and that the manner corresponding to the obtaining, by the network node, the stream channel quality information is the first manner, embodiments of the present invention provides a data processing method. As shown in FIG. 5, the method includes the following steps.

501. UE sends request information to a network node.

502. After receiving the request information, the network node sends control feedback information to the UE.

503. The UE generates stream channel quality information according to a downlink pilot signal and the control feedback information.

The UE first obtains an SINR of a data stream according to the downlink pilot signal, and then generates the stream channel quality information according to the SINR of the data stream and a feedback information format in the control feedback information. The stream channel quality information includes quality difference information of the data stream, or quality difference information of a code word corresponding to the data stream, or quality ranking information of the data stream, or change manner information of a port corresponding to the data stream.

504. The UE sends the stream channel quality information to the network node by using a time-frequency resource.

505. The network node determines, according to the stream channel quality information, port mapping of a to-be-transmitted data stream.

In the embodiments of the present invention, UE notifies a network node of quality of a data stream (stream channel quality information), so that the network node adjusts, according to the stream channel quality information, port mapping of a to-be-transmitted data stream, so that a channel quality difference between ports for transmitting data streams is relatively stable, and therefore accuracy of obtained code word quality corresponding to a code word including multiple data streams is relatively high, and accuracy of received data processed by the UE is relatively high.

Figure 6:
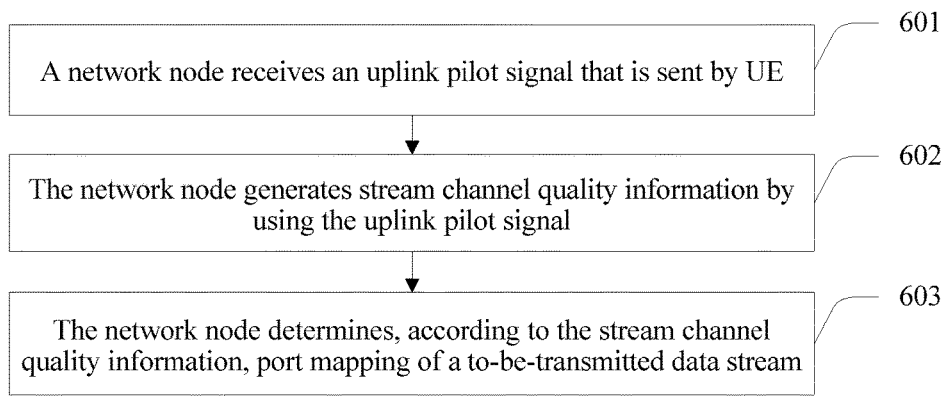
FIG. 6 is a flowchart of a further data processing method according to an embodiment of the present invention.

With reference to the foregoing description and that the manner corresponding to the obtaining, by the network node, the stream channel quality information is the second manner, embodiments of the present invention provide a further data processing method. As shown in FIG. 6, the method includes the following steps.

601. A network node receives an uplink pilot signal that is sent by UE.

602. The network node generates stream channel quality information by using the uplink pilot signal.

The stream channel quality information includes a signal to interference plus noise ratio SINR of a stream.

603. The network node determines port mapping of a to-be-transmitted data stream according to the stream channel quality information.

In the embodiments of the present invention, a network node adjusts port mapping of a to-be-transmitted data stream according to obtained stream channel quality information, so that a channel quality difference between ports for transmitting data streams is relatively stable, and therefore accuracy of obtained code word quality corresponding to a code word including multiple data streams is relatively high, and accuracy of received data processed by UE is relatively high.

Figure 7:
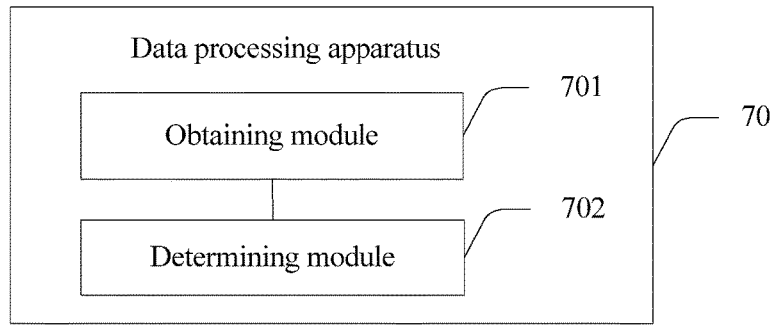
FIG. 7 is a schematic diagram of a logical structure of a data processing apparatus according to an embodiment of the present invention.

With reference to the foregoing description of FIG. 1 to FIG. 3, embodiments of the present invention further provide a data processing apparatus 70. The apparatus 70 is applied to a network node/network device. As shown in FIG. 7, the apparatus 70 includes an obtaining module 701 and a determining module 702.

The obtaining module 701 is configured to obtain stream channel quality information, and provide the stream channel quality information to the determining module 702, where the stream channel quality information is used to represent channel quality of a channel on which a data stream is located.

The determining module 702 is configured to determine port mapping of a to-be-transmitted data stream according to the stream channel quality information, where the port mapping is used to make channel quality of data streams distributed in a same code word satisfy the following: a sum of fluctuation values that is used to represent channel quality of data streams in all code words is less than a sum of fluctuation values that is used to represent channel quality of data streams in all code words in a case of original port mapping.

Figure 8:
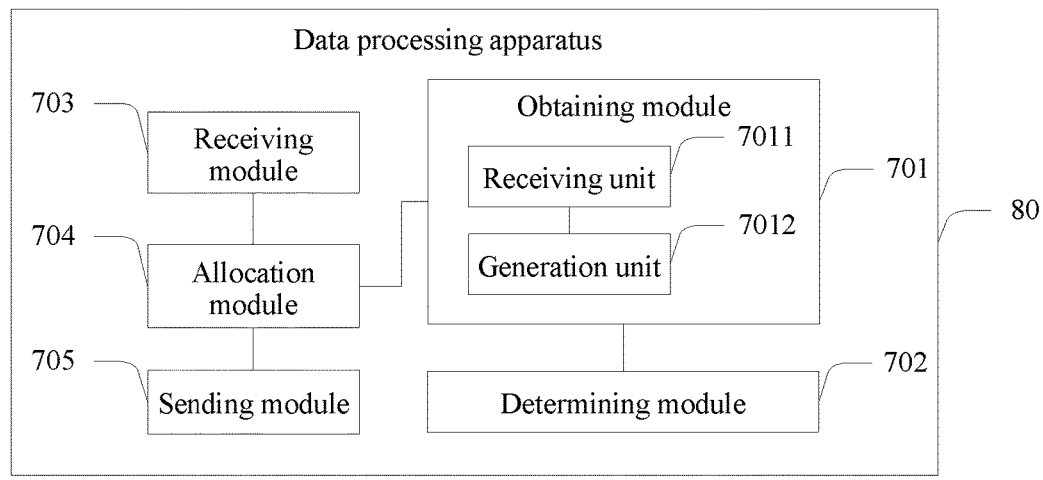
FIG. 8 is a schematic diagram of a logical structure of another data processing apparatus according to an embodiment of the present invention.

Further, the embodiments of the present invention may further provide another data processing apparatus 80. As shown in FIG. 8, the apparatus 80 further includes a receiving module 703, an allocation module 704, a sending module 705, and the obtaining module 701 including a receiving unit 7011 and a generation unit 7012.

Before the obtaining module 701 obtains the stream channel quality information, the receiving module 703 is configured to receive request information that is sent by UE, where the request information is used to request a time-frequency resource for transmitting the stream channel quality information.

The allocation module 704 is further configured to allocate, according to the request message, the time-frequency resource used for transmitting the stream channel quality information.

The sending module 705 is configured to send control feedback information to the UE, where the control feedback information includes a feedback information format and an instruction that is used for instructing the UE to feed back the stream channel quality information.

Correspondingly, the obtaining module 701 is specifically configured to receive, by using the time-frequency resource, the stream channel quality information that is sent by the UE.

In addition, the obtaining module 701 may obtain the stream channel quality information in multiple manners. Two manners are listed herein.

First manner: The receiving unit 7011 receives the stream channel quality information that is sent by the UE, where the stream channel quality information includes quality difference information of the data stream, or quality difference information of a code word corresponding to the data stream, or quality ranking information of the data stream, or change manner information of a port corresponding to the data stream.

Second manner: The receiving unit 7011 receives an uplink pilot signal that is sent by the UE, and then the generation unit 7012 generates the stream channel quality information by using the uplink pilot signal that is sent by the UE, where the stream channel quality information includes a signal to interference plus noise ratio SINR of the data stream.

Further, the determining module 702 is specifically configured to determine a modified matrix A according to the stream channel quality information, and determine the port mapping of the to-be-transmitted data stream by using A, where A is used to determine the port mapping of the to-be-transmitted data stream.

When the stream channel quality information includes the quality difference information of the data stream, the determining module 702 determines quality of the data stream according to a difference between the quality difference information of the data stream and quality of a reference stream, and determines A according to the quality of the data stream, where the reference stream is a data stream that is pre-agreed by the network node with the UE and that is used to determine the quality of the data stream; or when the stream channel quality information includes the quality difference information of the code word corresponding to the data stream, the determining module 702 determines quality of the data stream according to a difference between the quality difference information of the code word corresponding to the data stream and quality of a reference code word, and determines A according to the quality of the data stream, where the reference code word is a code word in which the data stream is located; or when the stream channel quality information includes the quality ranking information of the data stream, the determining module 702 determines a ranking manner of the data stream according to the quality ranking information of the data stream, and determines A according to the ranking manner of the data stream.

According to the data processing apparatus provided in this embodiment of the present invention, port mapping of a to-be-transmitted data stream is adjusted according to obtained stream channel quality information, so that a channel quality difference between ports for transmitting data streams is relatively stable, and therefore accuracy of obtained code word quality corresponding to a code word including multiple data streams is relatively high, and accuracy of received data processed by UE is relatively high.

Figure 9:
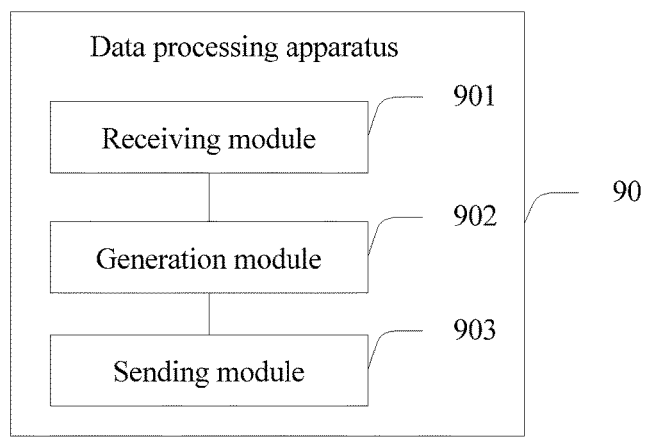
FIG. 9 is a schematic diagram of a logical structure of still another data processing apparatus according to an embodiment of the present invention.

With reference to FIG. 4 to FIG. 6, the embodiments of the present invention may further provide a data processing apparatus 90, and the apparatus 90 is applied to UE. As shown in FIG. 9, the apparatus 90 includes a receiving module 901, a generation module 902, and a sending module 903.

The receiving module 901 is configured to receive a downlink pilot signal that is sent by a network node, and provide the downlink pilot signal to the generation module 902.

The generation module 902 is configured to generate stream channel quality information according to the downlink pilot signal, and provide the stream channel quality information to the sending module 903, where the stream channel quality information is used to represent channel quality of a channel on which a data stream is located.

The sending module 903 is configured to send the stream channel quality information to the network node.

The stream channel quality information includes quality difference information of the data stream, or quality difference information of a code word corresponding to the data stream, or quality ranking information of the data stream, or change manner information of a port corresponding to the data stream.

It should be noted that a method for the generating, by the generation module 902, the stream channel quality information may be: obtaining an SINR of the data stream according to the downlink pilot signal, and generating the stream channel quality information according to the SINR of the data stream.

Further, optionally, before the receiving module 901 receives the downlink pilot signal that is sent by the network node, the sending module 903 is further configured to send request information to the network node, where the request information is used to request a time-frequency resource for transmitting the stream channel quality information.

The receiving module 901 is further configured to receive control feedback information that is sent by the network node, where the control feedback information includes a feedback information format and an instruction that is used for instructing the UE to feed back the stream channel quality information.

Correspondingly, the sending module 903 is specifically configured to send the stream channel quality information to the network node by using the time-frequency resource; and the generation module 902 is specifically configured to generate, according to the SINR of the data stream, the stream channel quality information in the feedback information format.

In the embodiments of the present invention, UE notifies a network node of quality of a data stream (stream channel quality information), so that the network node adjusts, according to the stream channel quality information, port mapping of a to-be-transmitted data stream, so that a channel quality difference between ports for transmitting data streams is relatively stable, and therefore accuracy of obtained code word quality corresponding to a code word including multiple data streams is relatively high, and accuracy of received data processed by UE is relatively high.

Figure 10:
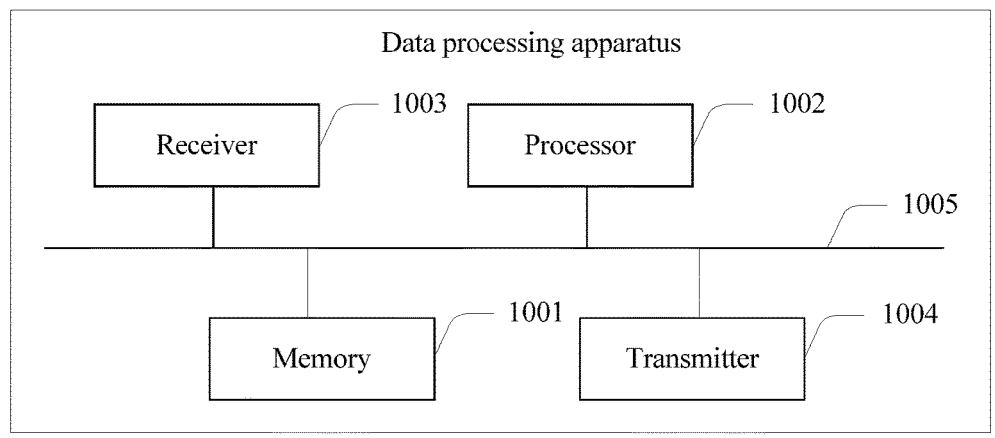
FIG. 10 is a schematic diagram of a logical structure of a further data processing apparatus according to an embodiment of the present invention.

The embodiments of the present invention may further provide a data processing apparatus 100. As shown in FIG. 10, the figure of the apparatus 100 is a schematic structural diagram of hardware of a network node. The apparatus 100 includes a memory 1001, a processor 1002, a receiver 1003, a transmitter 1004, and a bus 1005.

The memory 1001 may be a ROM (Read Only Memory), a static storage device, a dynamic storage device, or a RAM (Random Access Memory). The memory 1001 may store an operating system and another application program. When the technical solution provided in this embodiment of the present invention is implemented by using software or firmware, program code used to implement the technical solution provided in this embodiment of the present invention is stored in the memory 1001, and is executed by the processor 1002.

The receiver 1003 is used for communication between the apparatus and another device or communications network (for example but without being limited to, an Ethernet, a RAN (Radio Access Network), and a WLAN (Wireless Local Area Network).

A general-purpose central processing unit (CPU), a microprocessor, an application-specific integrated circuit (ASIC), or one or more integrated circuits may be used as the processor 1002, so as to be configured to execute a related program to implement the technical solution provided in this embodiment of the present invention.

The bus 1005 may include a channel, to transmit information between parts (for example, the memory 1001, the receiver 1003, and the processor 1002) of the apparatus.

It should be noted that, although hardware shown in FIG. 10 includes only the memory 1001, the receiver 1003, the processor 1002, and the bus 1005, in a specific implementation process, a person skilled in the art should understand that, a terminal further includes another component that is necessary for normal operation. In addition, depending on a specific requirement, a person skilled in the art should understand that a hardware component for implementing another function may also be included.

Specifically, when the network node shown in FIG. 10 is configured to implement the apparatus shown in FIG. 7 and FIG. 8, the processor 1002 in the apparatus is coupled to the memory 1001, the receiver 1003, and the transmitter 1004, and is configured to control execution of a program instruction, and is specifically configured to obtain stream channel quality information, where the stream channel quality information is used to represent channel quality of a channel on which a data stream is located; and determine port mapping of a to-be-transmitted data stream according to the stream channel quality information, where the port mapping is used to make channel quality of data streams distributed in a same code word satisfy the following: a sum of fluctuation values that is used to represent channel quality of data streams in all code words is less than a sum of fluctuation values that is used to represent channel quality of data streams in all code words in a case of original port mapping.

Further, optionally, the receiver 1003 is configured to receive the stream channel quality information that is sent by UE, where the stream channel quality information includes quality difference information of the data stream, or quality difference information of a code word corresponding to the data stream, or quality ranking information of the data stream, or change manner information of a port corresponding to the data stream.

Further, optionally, the receiver 1003 is further configured to receive an uplink pilot signal that is sent by the UE, and then the processor 1002 is configured to generate the stream channel quality information by using the uplink pilot signal that is sent by the UE, where the stream channel quality information includes a signal to interference plus noise ratio SINR of the data stream.

Further, optionally, the processor 1002 is further configured to determine a modified matrix A according to the stream channel quality information, and determine the port mapping of the to-be-transmitted data stream by using A, where A is used to determine the port mapping of the to-be-transmitted data stream. When the stream channel quality information includes the quality difference information of the data stream, the processor 1002 determines quality of the data stream according to a difference between the quality difference information of the data stream and quality of a reference stream, and determines A according to the quality of the data stream, where the reference stream is a data stream that is pre-agreed by the network node with the UE and that is used to determine the quality of the data stream; or when the stream channel quality information includes the quality difference information of the code word corresponding to the data stream, the processor 1002 determines quality of the data stream according to a difference between the quality difference information of the code word corresponding to the data stream and quality of a reference code word, and determines A according to the quality of the data stream, where the reference code word is a code word in which the data stream is located; or when the stream channel quality information includes the quality ranking information of the data stream, the processor 1002 determines a ranking manner of the data stream according to the quality ranking information of the data stream, and determines A according to the ranking manner of the data stream.

Further, optionally, the receiver 1003 is further configured to receive request information that is sent by the UE, where the request information is used to request a time-frequency resource for transmitting the stream channel quality information.

The transmitter 1004 is configured to send control feedback information to the UE, where the control feedback information includes a feedback information format and an instruction that is used for instructing the UE to feed back the stream channel quality information, where a format of the stream channel quality information and the feedback information format are the same.

Correspondingly, the receiver 1003 is specifically configured to receive, by using the time-frequency resource, the stream channel quality information that is sent by the UE.

In embodiments of the present invention, port mapping of a to-be-transmitted data stream is adjusted according to obtained stream channel quality information, so that a channel quality difference between ports for transmitting data streams is relatively stable, and therefore accuracy of obtained code word quality corresponding to a code word including multiple data streams is relatively high, and accuracy of received data processed by UE is relatively high.

Figure 11:
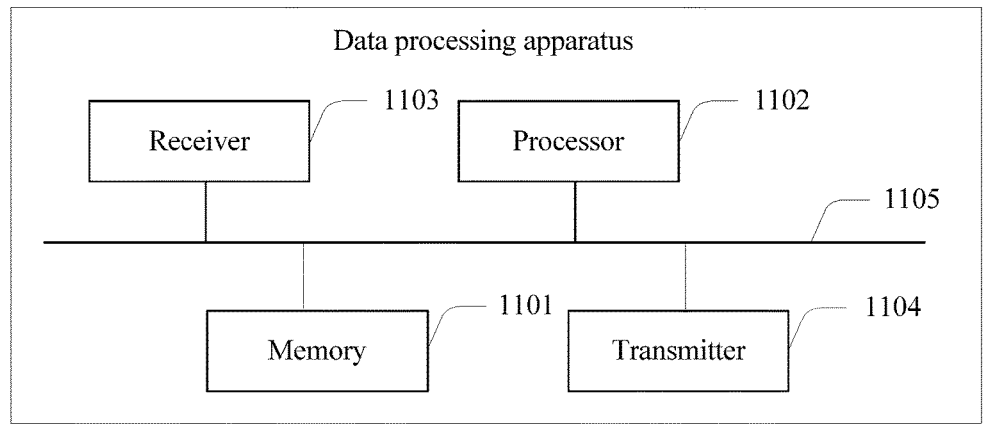
FIG. 11 is a schematic diagram of a logical structure of yet another data processing apparatus according to an embodiment of the present invention.

Embodiments of the present invention may further provide a data processing apparatus 110. As shown in FIG. 11, the figure of the apparatus 110 is a schematic structural diagram of hardware of UE. The apparatus 110 includes a memory 1101, a receiver 1102, a processor 1103, a transmitter 1104, and a bus 1105.

For description of common functions of the memory 1101, the receiver 1102, the processor 1103, and the transmitter 1104 in the apparatus, refer to the description of the memory 1001, the receiver 1002, the processor 1003, and the transmitter 1004 that are included in the network node in FIG. 10, and details are not described herein.

It should be noted that, although hardware shown in FIG. 11 includes only the memory 1101, the receiver 1102, the processor 1103, and the transmitter 1104, in a specific implementation process, a person skilled in the art should understand that, the terminal further includes another component that is necessary for normal operation. In addition, depending on a specific requirement, a person skilled in the art should understand that a hardware component for implementing another function may also be included.

Specifically, when the UE shown in FIG. 11 is configured to implement the apparatus shown in the embodiment in FIG. 9, the receiver 1102 in the apparatus is configured to receive a downlink pilot signal that is sent by a network node, and send the downlink pilot signal to the processor 1103.

The processor 1103 is coupled to the memory 1101, the receiver 1102, and the transmitter 1104, and is configured to control execution of a program instruction, and is specifically configured to generate stream channel quality information according to the downlink pilot signal, and provide the stream channel quality information to the transmitter 1104, where the stream channel quality information is used to represent channel quality of a channel on which a data stream is located.

The transmitter 1104 is configured to send the stream channel quality information to the network node.

A method for the generating, by the processor 1103, the stream channel quality information is specifically: obtaining a signal to interference plus noise ratio SINR of the data stream according to the downlink pilot signal, and generating the stream channel quality information according to the SINR of the data stream. The stream channel quality information includes quality difference information of the data stream, or quality difference information of a code word corresponding to the data stream, or quality ranking information of the data stream, or change manner information of a port corresponding to the data stream.

Further, optionally, the transmitter 1104 is further configured to send request information to the network node, where the request information is used to request a time-frequency resource for transmitting the stream channel quality information.

The receiver 1102 is further configured to receive control feedback information that is sent by the network node, where the control feedback information includes a feedback information format and an instruction that is used for instructing the UE to feed back the stream channel quality information.

Correspondingly, the transmitter 1104 is specifically configured to send the stream channel quality information to the network node by using the time-frequency resource.

The processor 1103 is specifically configured to generate, according to the SINR of the data stream, the stream channel quality information in the feedback information format.

In embodiments of the present invention, port mapping of a to-be-transmitted data stream is adjusted according to obtained stream channel quality information, so that a channel quality difference between ports for transmitting data streams is relatively stable, and therefore accuracy of obtained code word quality corresponding to a code word including multiple data streams is relatively high, and accuracy of received data processed by UE is relatively high.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
    obtaining stream channel quality information, wherein the stream channel quality information represents channel quality of a channel on which a first data stream is located; and
    determining port mapping of a to-be-transmitted second data stream according to the stream channel quality information, wherein the port mapping is used to make channel quality of data streams distributed in a same code word satisfy a relation, the relation being that a sum of fluctuation values that represent channel quality of data streams in all code words is less than a sum of fluctuation values that represent channel quality of data streams in all code words in a case of original port mapping.

2. The method according to claim 1, wherein obtaining the stream channel quality information comprises:
    receiving the stream channel quality information that is sent by a user equipment (UE), wherein the stream channel quality information comprises quality difference information of the first data stream, or quality difference information of a code word corresponding to the first data stream, or quality ranking information of the first data stream, or change manner information of a port corresponding to the first data stream.

3. The method according to claim 2, wherein determining port mapping of the to-be-transmitted second data stream according to the stream channel quality information comprises:
    determining a modified matrix A according to the stream channel quality information, and determining the port mapping of the to-be-transmitted second data stream by using A, wherein A is used to determine the port mapping of the to-be-transmitted second data stream;
    when the stream channel quality information comprises the quality difference information of the first data stream, determining quality of the first data stream according to a difference between the quality difference information of the first data stream and quality of a reference stream, and determining A according to the quality of the first data stream, wherein the reference stream is pre-agreed by the UE and is used to determine the quality of the first data stream;
    when the stream channel quality information comprises the quality difference information of the code word corresponding to the first data stream, determining quality of the first data stream according to a difference between the quality difference information of the code word corresponding to the first data stream and quality of a reference code word, and determining A according to the quality of the first data stream, wherein the reference code word is a code word in which the first data stream is located; and
    when the stream channel quality information comprises the quality ranking information of the first data stream, determining a ranking manner of the first data stream according to the quality ranking information of the first data stream, and determining A according to the ranking manner of the first data stream.

4. The method according to claim 2, wherein before receiving the stream channel quality information that is sent by user equipment UE, the method further comprises:
    receiving request information that is sent by the UE, wherein the request information requests a time-frequency resource for transmitting the stream channel quality information;

allocating, according to the request information, the time-frequency resource for transmitting the stream channel quality information; and sending control feedback information to the UE, wherein the control feedback information comprises a feedback information format and an instruction that is used for instructing the UE to feed back the stream channel quality information;

wherein receiving the stream channel quality information that is sent by user equipment UE comprises receiving, using the time-frequency resource, the stream channel quality information that is sent by the UE.

5. The method according to claim 1, wherein obtaining the stream channel quality information comprises:

receiving an uplink pilot signal that is sent by a user equipment (UE); and generating the stream channel quality information using the uplink pilot signal that is sent by the UE, wherein the stream channel quality information comprises a signal to interference plus noise ratio (SINR) of the first data stream.

6. A method, comprising:

sending request information to a network node, wherein the request information requests a time-frequency resource for transmitting stream channel quality information;

receiving control feedback information that is sent by the network node, wherein the control feedback information comprises a feedback information format and an instruction that instructs a user equipment to feed back the stream channel quality information;

receiving a downlink pilot signal that is sent by the network node;

obtaining a signal to interference plus noise ratio (SINR) of a data stream according to the downlink pilot signal;

generating, according to the SINR of the data stream, the stream channel quality information in the feedback information format, wherein the stream channel quality information indicates channel quality of a channel on which the data stream is located; and sending the stream channel quality information to the network node using the time-frequency resource.

7. The method according to claim 6, wherein the stream channel quality information comprises quality difference information of the data stream, quality difference information of a code word corresponding to the data stream, quality ranking information of the data stream, or change manner information of a port corresponding to the data stream.

8. An apparatus, comprising:

a non-transitory memory, configured to store information comprising a program instruction; and a receiver, configured to:
receive control feedback information that is sent by a network node, wherein the control feedback information comprises a feedback information format and an instruction that instructs a user equipment to feedback stream channel quality information; and
receive a downlink pilot signal that is sent by the network node, and provide the downlink pilot signal to a processor;

the processor, coupled to the memory, the receiver, and a transmitter, wherein the processor is configured to execute the program instruction to:

obtain a signal to interference plus noise ratio (SINR) of a data stream according to the downlink pilot signal;

generate, according to the SINR of the data stream, the stream channel quality information in the feedback information format, wherein the stream channel quality information represent channel quality of a channel on which the data stream is located; and provide the stream channel quality information to the transmitter; and the transmitter, configured to:
send request information to the network node, wherein the request information requests a time-frequency resource for transmitting the stream channel quality information; and
send the stream channel quality information to the network node using the time-frequency resource.

9. The apparatus according to claim 8, wherein the stream channel quality information comprises quality difference information of the data stream, quality difference information of a code word corresponding to the data stream, quality ranking information of the data stream, or change manner information of a port corresponding to the data stream.

10. The method according to claim 2, wherein the stream channel quality information comprises the quality difference information of the first data stream.

11. The method according to claim 2, wherein the stream channel quality information comprises the quality difference information of the code word corresponding to the first data stream.

12. The method according to claim 2, wherein the stream channel quality information comprises the quality ranking information of the first data stream.

13. The method according to claim 2, wherein the stream channel quality information comprises the change manner information of the port corresponding to the first data stream.

14. The apparatus according to claim 9, wherein the stream channel quality information comprises the quality difference information of the data stream.

15. The apparatus according to claim 9, wherein the stream channel quality information comprises the quality difference information of the code word corresponding to the data stream.

16. The apparatus according to claim 9, wherein the stream channel quality information comprises the quality ranking information of the data stream.

17. The apparatus according to claim 9, wherein the stream channel quality information comprises the change manner information of the port corresponding to the data stream.

18. The method according to claim 7, wherein the stream channel quality information comprises the quality difference information of the data stream.

19. The method according to claim 7, wherein the stream channel quality information comprise the quality difference information of a code word corresponding to the data stream.

20. The method according to claim 7, wherein the stream channel quality information comprises the quality ranking information of the data stream.

* * * * *